United States Patent [19]

Numata

[11] Patent Number: 5,067,625

[45] Date of Patent: Nov. 26, 1991

[54] DEVICE FOR OPENING AND CLOSING LID

[75] Inventor: Masanori Numata, Yokohama, Japan

[73] Assignee: Nifco Inc., Yokohama, Japan

[21] Appl. No.: 531,746

[22] Filed: Jun. 1, 1990

[30] Foreign Application Priority Data

Jun. 5, 1989 [JP] Japan ................... 1-141252

[51] Int. Cl.⁵ .................. B65D 43/14; B65D 51/04
[52] U.S. Cl. .................... 220/343; 220/230;
220/263; 220/334; 220/335
[58] Field of Search ............... 220/230, 263, 264, 335,
220/343, 334

[56]  References Cited

U.S. PATENT DOCUMENTS

| 1,203,987 | 11/1916 | Davis | 220/264 |
| 1,384,254 | 7/1921 | Hagley | 220/264 |
| 2,124,349 | 7/1938 | Herbster | 220/264 X |
| 4,375,863 | 3/1983 | Kappler | 220/334 |
| 4,787,488 | 11/1988 | Campanini | 220/230 X |

FOREIGN PATENT DOCUMENTS

| 56-22273 | 2/1981 | Japan . |
| 56-140669 | 10/1981 | Japan . |
| 56-174681 | 12/1981 | Japan . |
| 57-62287 | 4/1982 | Japan . |
| 58-27473 | 2/1983 | Japan . |
| 58-37375 | 3/1983 | Japan . |
| 61-22878 | 2/1986 | Japan . |

Primary Examiner—Stephen Marcus
Assistant Examiner—Nova Stucker
Attorney, Agent, or Firm—Oblon, Spivak, McClelland, Maier & Neustadt

[57]  ABSTRACT

A device for opening and closing a lid of a box consisting of a housing and the lid includes a first link having one end linked to the housing at the edge of the opening and the other end linked to the lid and a second link extending parallel to the first link and having one end like the aforesaid one end of the first link linked to the lid and the other end linked to the housing at the edge of the opening. The lid is supported such that it can be opened and closed in two directions about the links.

17 Claims, 13 Drawing Sheets

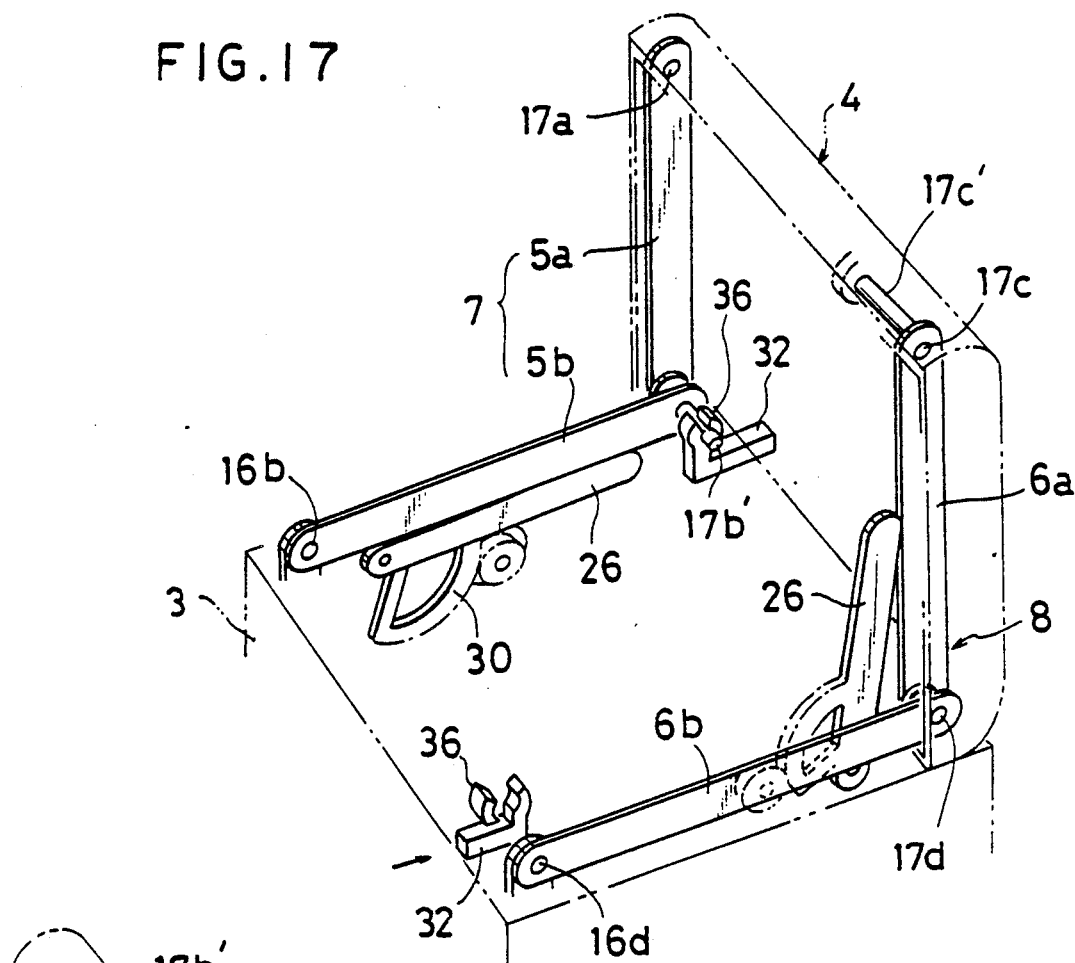

DEVICE FOR OPENING AND CLOSING LID

BACKGROUND OF THE INVENTION

1. Field of the Invention

This invention relates to a device for opening and closing a lid and, more particularly, to a device for opening and closing a lid, which can be used for an automotive center console box, for instance, such that it can be opened either from the side of the driver's seat or from the opposite side.

2. Prior Art Statement

Various devices permitting a door or window to be opened in two different directions have been proposed (as disclosed in Japanese Utility Model Public Disclosure Nos. 56-22273, 56-140669, 56-174681, 57-62287, 58-27473, 58-37375 and 61-22878, for example).

Any of the above prior art devices, includes a mechanism for bringing a hinge shaft into and out of a door. Therefore, the door itself is complicated in structure and of large size, thickness and weight. For this reason, the device can be used only with difficulty for a small and thin lid.

SUMMARY OF THE INVENTION

This invention has been accomplished in the light of the above problems inherent in the prior art devices for opening and closing a door, a lid or the like, and its object is to provide a device which can be suitably used for a small and thin lid as well.

To attain the above object of the invention, there is provided a device for opening and closing a lid, which is provided between the lid and a housing with an opening thereof closed by the lid, and which comprises first link means having one end linked to the housing at the edge of the opening and the other end to the lid, and second link means extending parallel to the first link means and having one end like the aforesaid one end of the first link means linked to the lid and the other end linked to the housing at the edge of the opening.

With the device for opening and closing a lid according to the invention, the first and second link means are provided between the housing and lid. Therefore, the device can be readily incorporated in a box having a small and thin lid, and the lid can be opened from either side.

The above and other features and objects of the invention will become apparent from the following detailed description made with reference to the attached drawings.

BRIEF DESCRIPTION OF THE DRAWINGS

FIG. 17 is a perspective view showing the device of FIG. 12 with the lid opened in one direction; and FIG. 18 is a perspective view showing the device of FIG. 12 with the lid opened in the opposite direction.

DETAILED DESCRIPTION OF THE PREFERRED EMBODIMENTS

Figure 3:
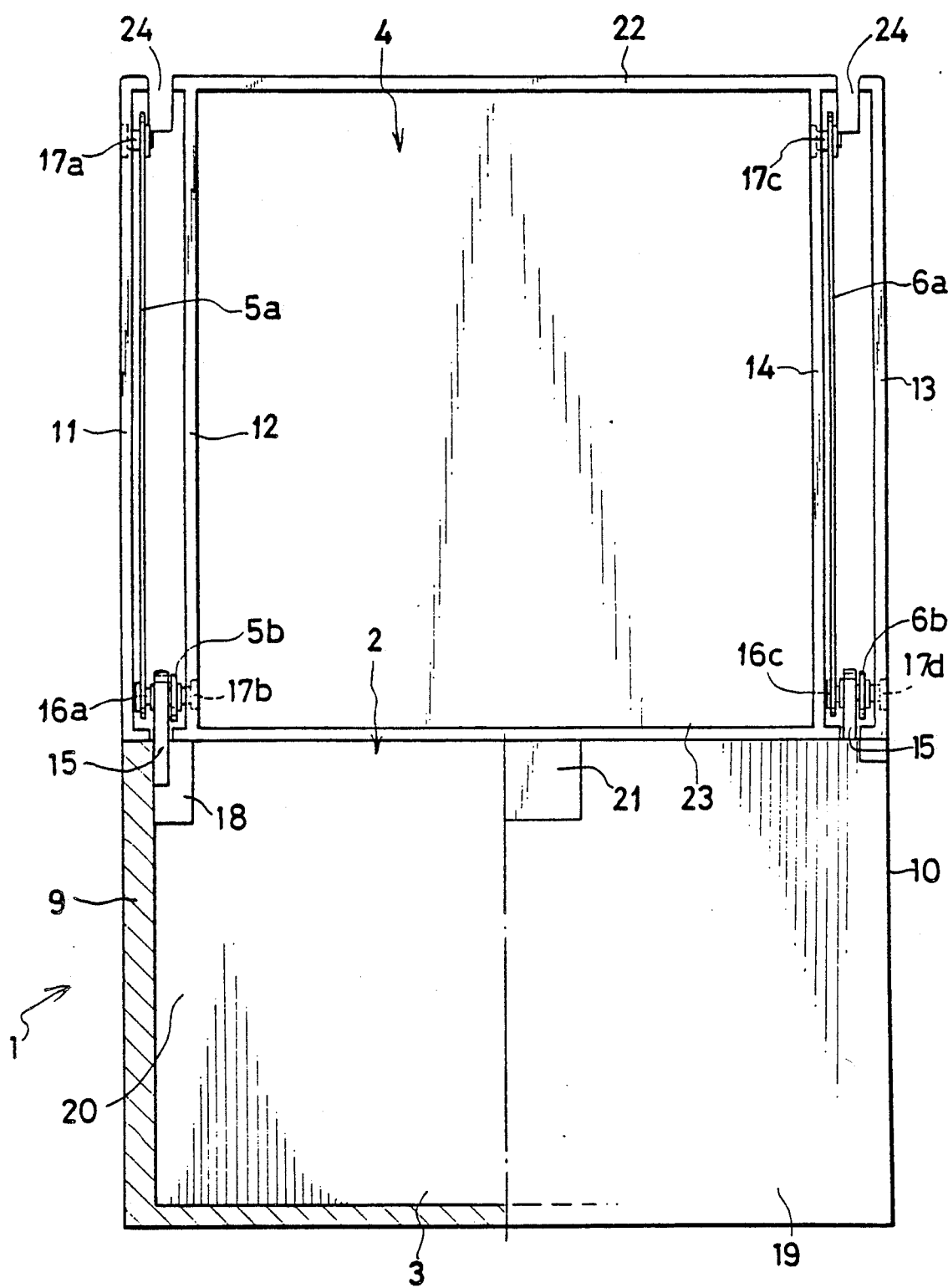
FIG. 3 is a side view showing the device of FIG. 1 with the lid of the box opened.
Figure 4:
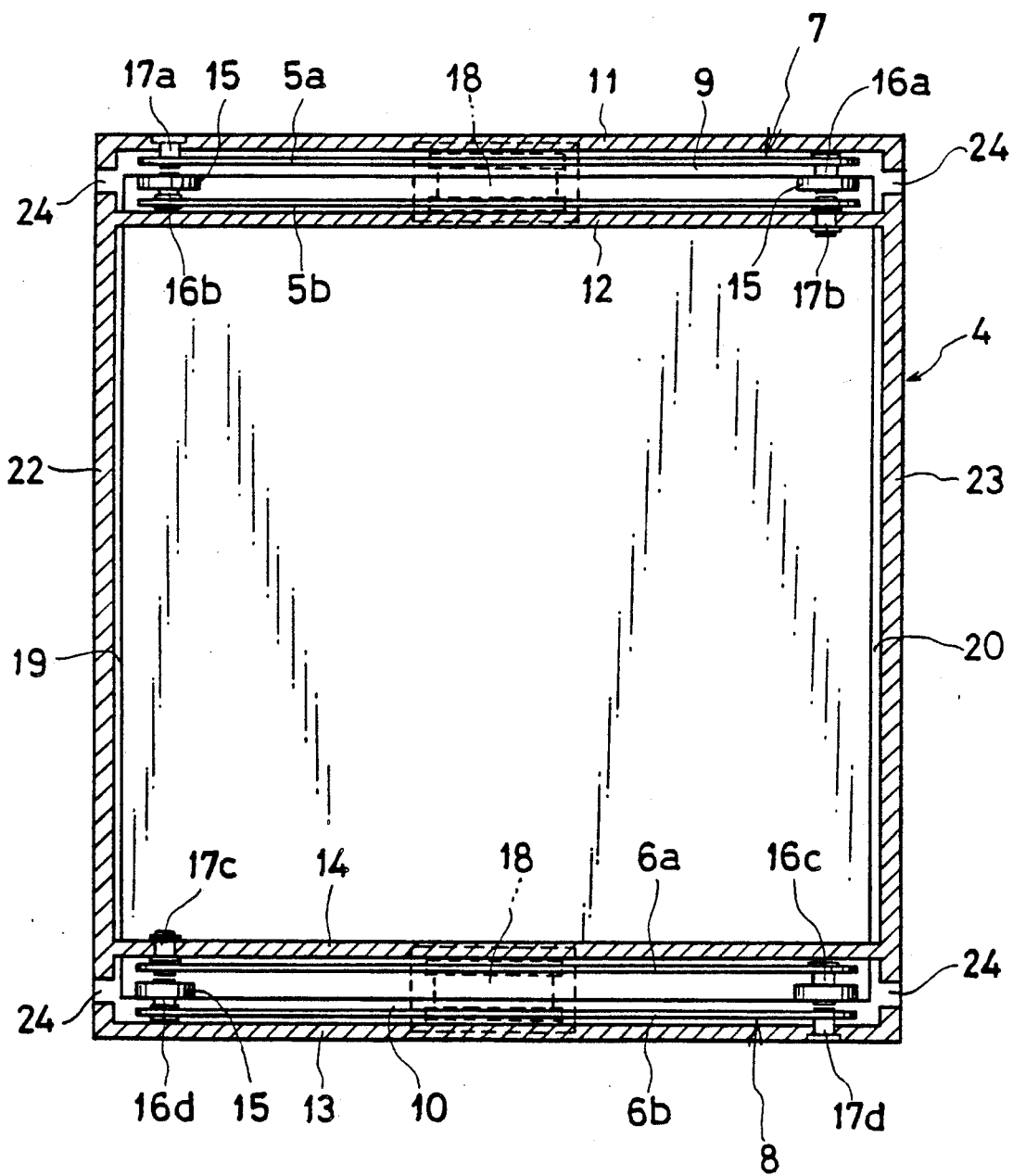
FIG. 4 is a plan view showing the device of FIG. 1 with the lid in section.
Figure 5:
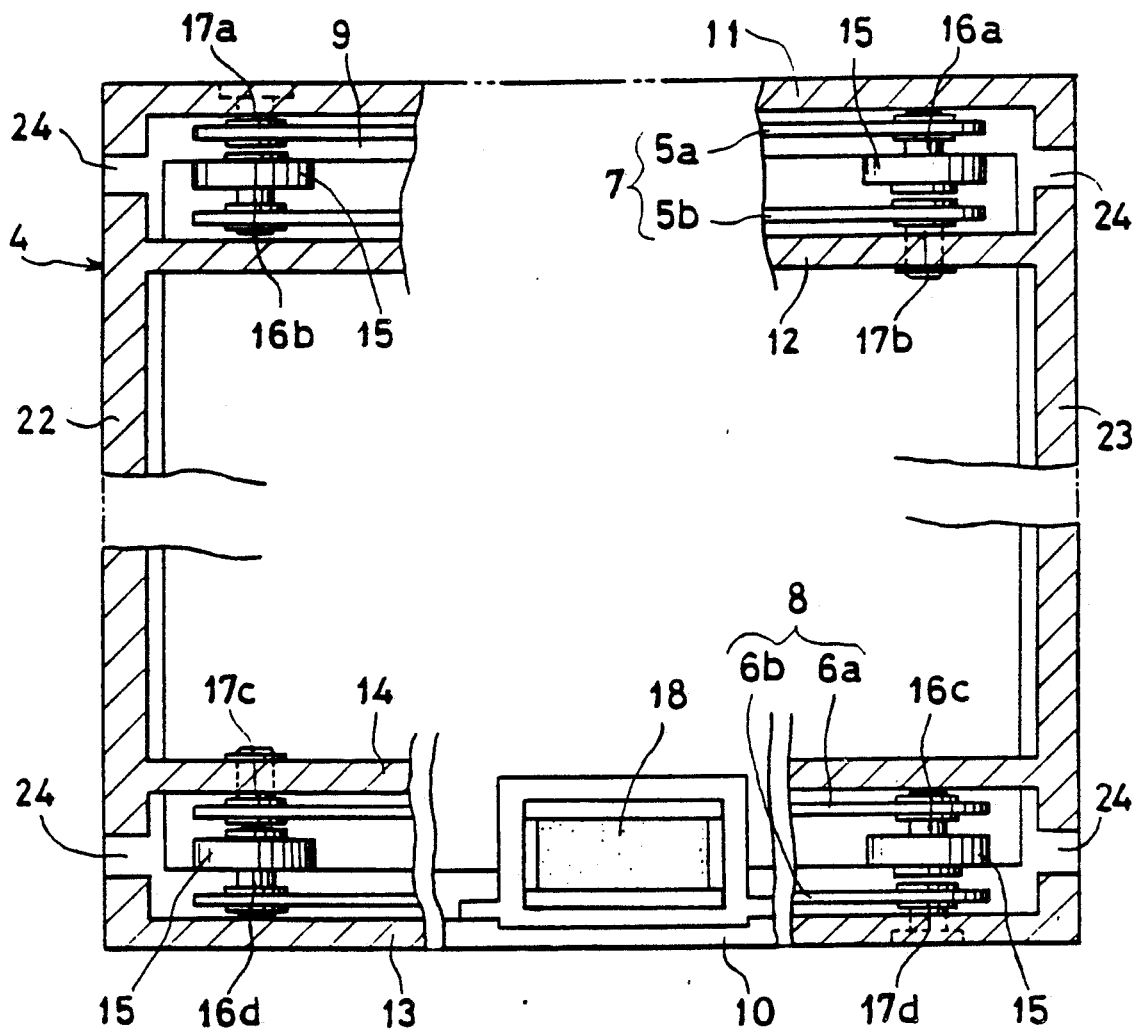
FIG. 5 is a fragmentary enlarged plan view showing the device of FIG. 4.
Figure 6:
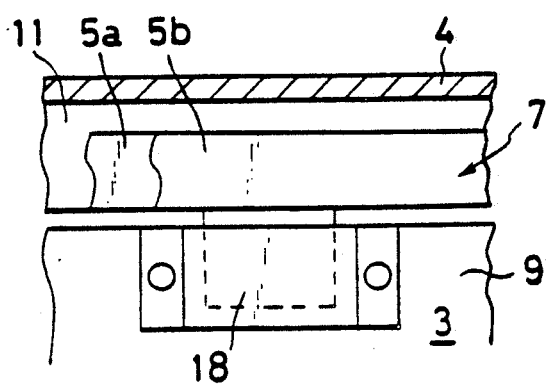
FIG. 6 is a fragmentary enlarged front view showing the principal parts of the device of FIG. 4.
Figure 7:
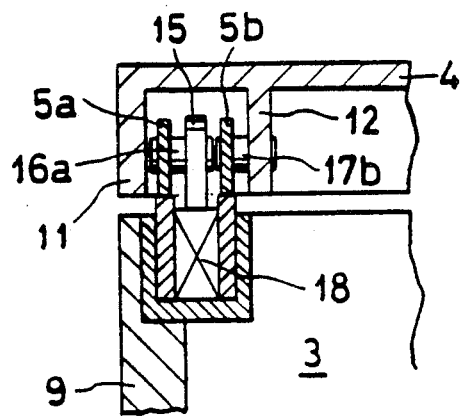
FIG. 7 is an enlarged sectional side view showing the device of FIG. 4.

FIGS. 1 to 9 show a first embodiment of the device for opening and closing a lid according to the invention. This embodiment of the device is applied to a center console box 1 provided between a driver's seat and the other front seat in a vehicle. The console box 1 comprises a hollow housing 3 having a square opening 2 at the top and a lid 4 linked to the housing 3 at the edge of the opening 2 so as to be openable and closable from the opposite sides of the opening 2, i.e., from the side of the driver's seat and from the opposite side. As shown in FIGS. 3, 4 and 7, the lid 4 is in the form of a hollow case open at the bottom, and its inside is provided with front and rear ribs 12 and 14 respectively facing the inner side surfaces of front and rear edges 11 and 13 of the lid 4, the ribs 12 and 14 being spaced apart such that link mechanisms 7 and 8 to be described later are upwardly fitted between them. The housing 3 and lid 4 are suitably fabricated as plastic moldings.

As shown in FIGS. 4 and 5, the front wall 9 of the housing 3 and the front edge 11 of the lid 4 are provided with a front link mechanism 7 which includes a first link 5a having one end linked by a pin 17a to the left end inner wall of the front edge 11 and the other end linked by a pin 16a to a bearing 15 projecting from the right end of the front wall 9 of the housing 3 and a second link 5b extending parallel to the first link 5a and having one end like the aforesaid one end of the first link 5a linked by a pin 16b aligned with the pin 17a to a bearing 15 projecting from the left end of the front wall 9 of the housing 3 and the other end linked by a pin 17b aligned with the pin 16a to the right end inner wall of the front rib 12 of the lid 4.

The rear wall 10 of the housing 3 on the side of the opening 2 opposite the front wall 9 and the rear edge 13 of the lid 4 are provided with a similar rear link mechanism 8 which includes a first link 6a having one end linked by a pin 17c to the left end inner wall of the rear rib 14 of the lid 4 and the other end linked by a pin 16c to a bearing 15 projecting from the right end of the rear wall 10 of the housing 3 and a second link 6b extending parallel to the first link 6a and having one end like the aforesaid one end of the first link 6a linked by a pin 16d to a bearing 15 projecting from the left end of the rear wall 10 of the housing 3 and the other end linked by a pin 17d aligned with the pin 16c to the right end inner wall of the rear edge 13 of the lid 4.

Thus, the first link 5a of the front link mechanism 7 and the first link 6a of the rear link mechanism 8, and also the second link 5b of the front link mechanism 7 and the second link 6b of the rear link mechanism 8, are in the same bearing relation to each other.

Figure 1:
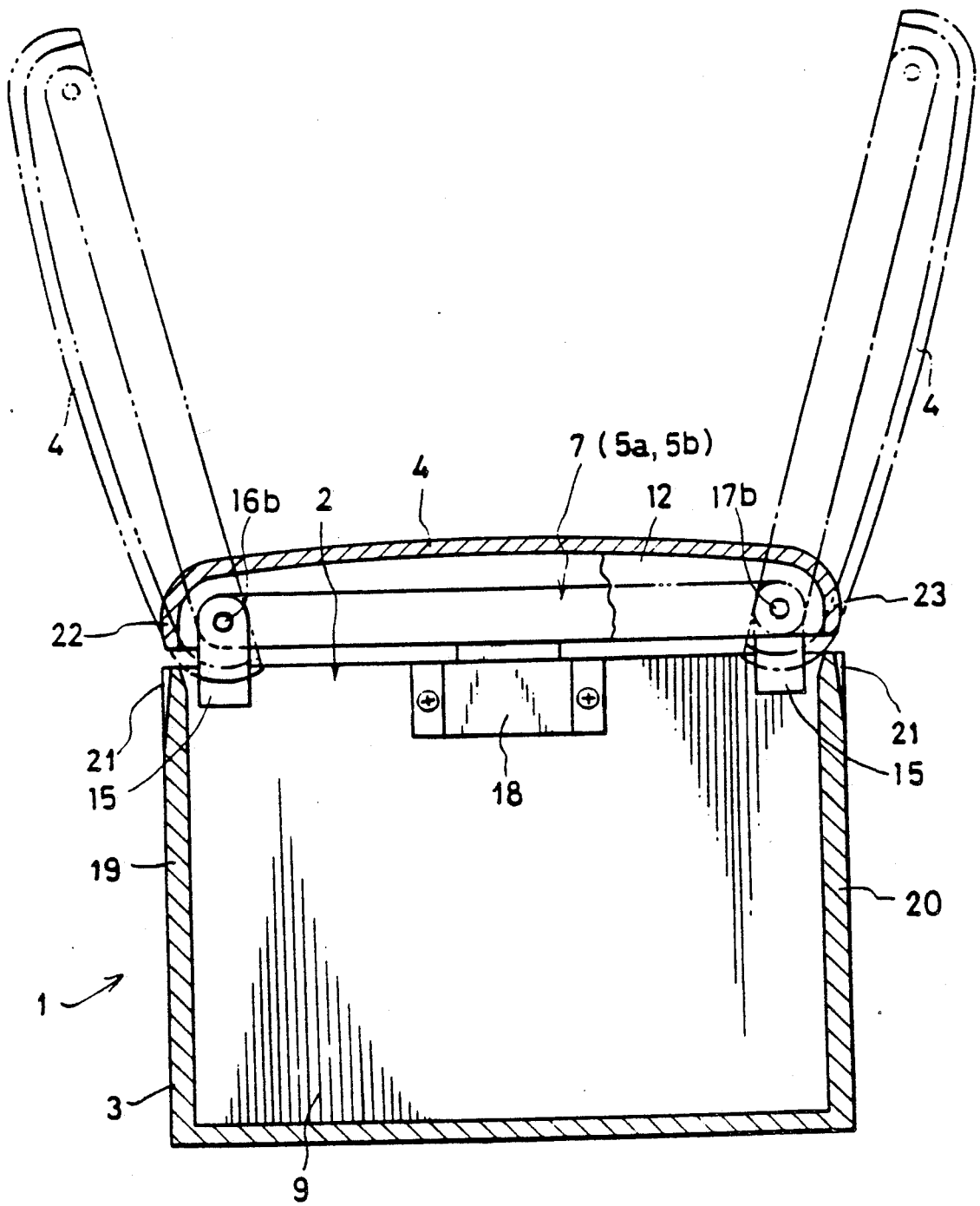
FIG. 1 is a cross section showing a box to which a first embodiment of the device for opening and closing a lid according to the invention is applied.
Figure 2:
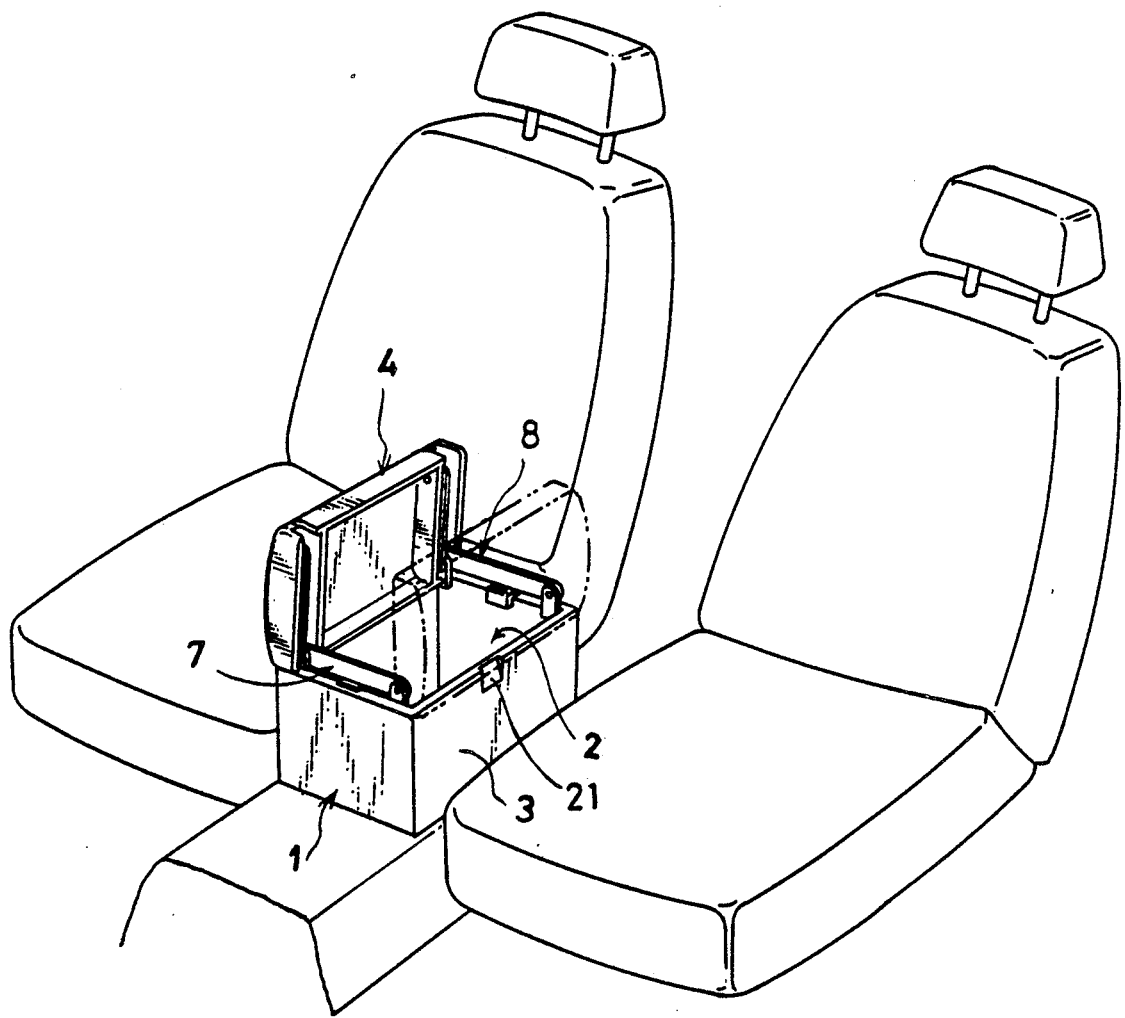
FIG. 2 is a perspective view showing the box of FIG. 1.

The first and second links 5a, 6a and 5b, 6b of the link mechanisms 7 and 8 are made of a hard plastic material, a metal or the like. When the opening 2 of the housing 3 is closed by the lid 4, the link mechanisms 7 and 8 are accommodated in a gap defined by the front and rear ribs 12 and 14 in the lid 4 and the inner wall surfaces of the housing 3. As shown in FIG. 1, the outer surfaces of the left and right side walls 19 and 20 of the housing 3 are formed with substantially central upper shallow guide grooves 21 such that fingers are upwardly hooked on the lower edges of the lid 4. As shown in FIG. 5, the left and right edges 22 and 23 of the lid 4 are formed with U-shaped notches 24 extending from the lower end to prevent the edges 22 and 23 from striking the bearings 15 when opening the lid 4.

In FIGS. 1 and 4, the two reference numerals 18 at the center of the front and rear walls 9 and 10 of the housing 3 designate permanent magnets serving as locking means. Where the first links 5a and 6a and the second links 5b and 6b which are found right above the magnets 18 are made of iron, they are attracted to the magnets when the lid is closed.

The operation of the console box 1 provided with the device having the above construction will now be described.

First, to open the lid 4 from the closed state as shown in FIG. 1, the operator fits his fingers in one of the shallow guide grooves 21 formed in the left and right side walls 19 and 20 of housing 3, which depends on which side he intends to open the lid, and the lid is raised by hooking the fingers on the lower edge of the lid.

Figure 8:
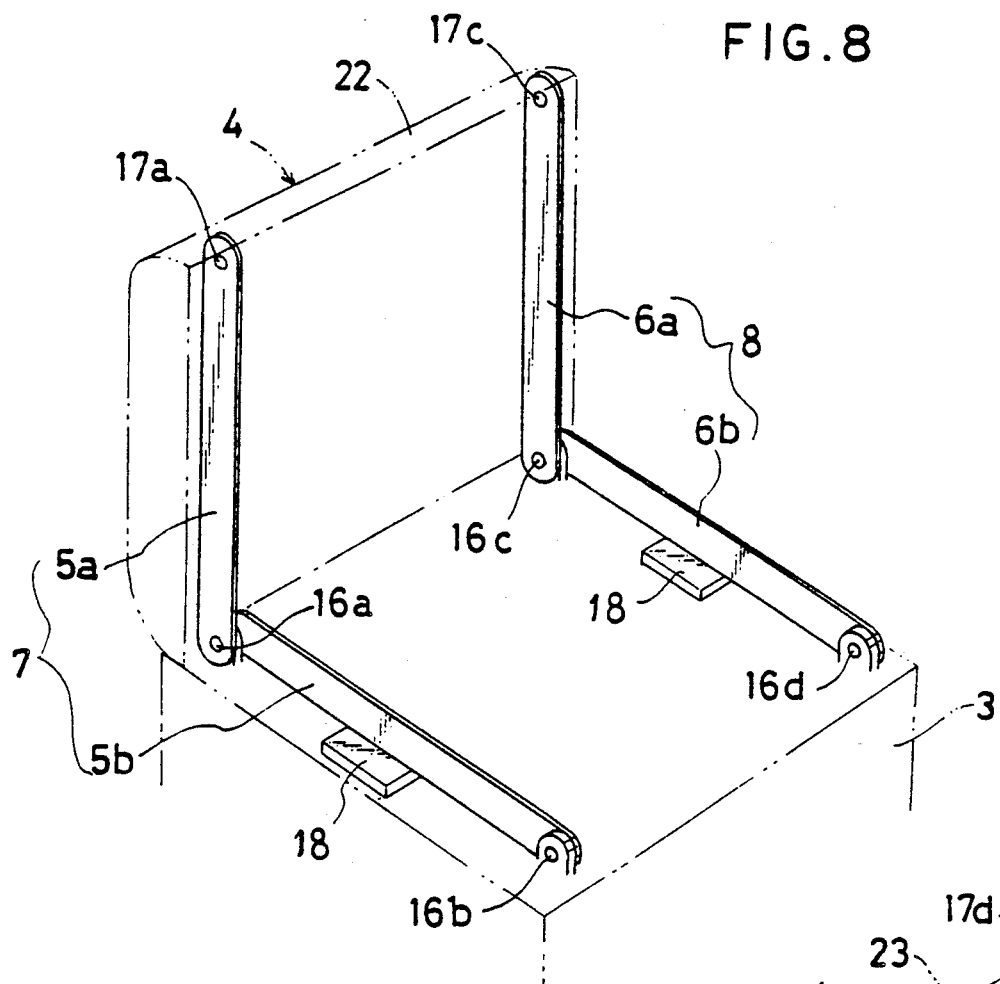
FIG. 8 is a perspective view showing the device of FIG. 4 with the lid opened in one direction.

When the left edge 22 of the lid 4 is raised, for instance, as shown in FIG. 8, the first links 5a and 6a are turned upwardly in unison with the lid 4 about the pins 16a and 16c located forwardly in the opening direction. At this time, the front edges of the second links 5b and 6b in the direction of opening, which are linked by the pins 16b and 16d to the housing 3, cannot be turned but are held in the horizontal state.

The fully opened state of the lid 4 is determined by the striking of the outer surface of the lid against the upper edge of the right side wall 20 of the housing 3 (as shown by dash-and-bar lines in FIG. 1).

Figure 9:
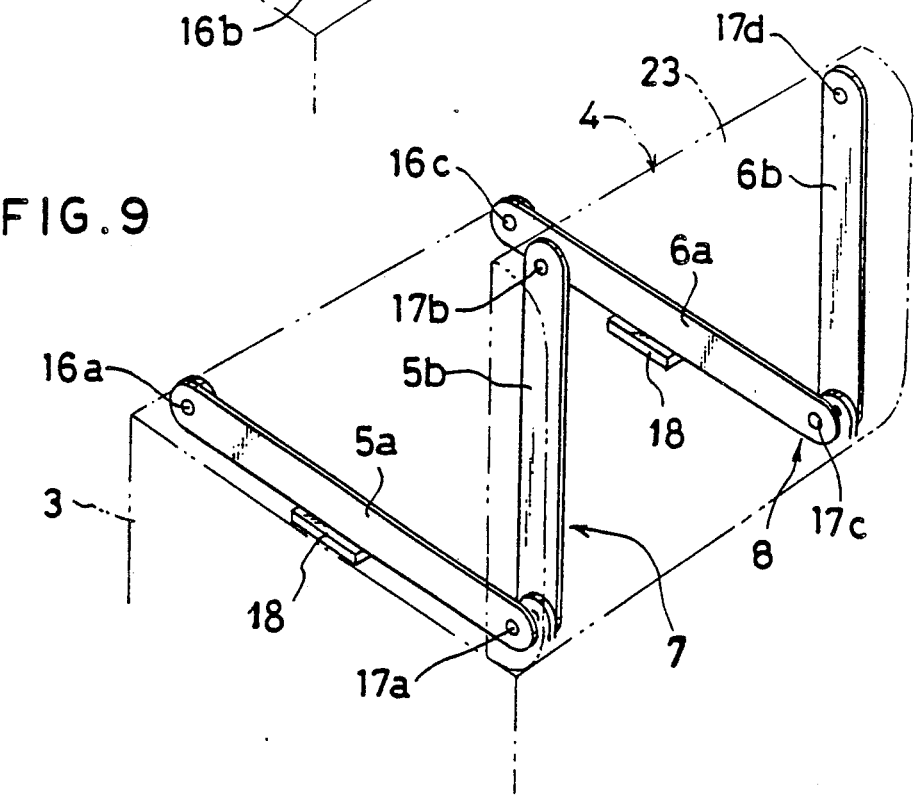
FIG. 9 is a perspective view showing the device of FIG. 4 with the lid opened in the opposite direction.
Figure 10:
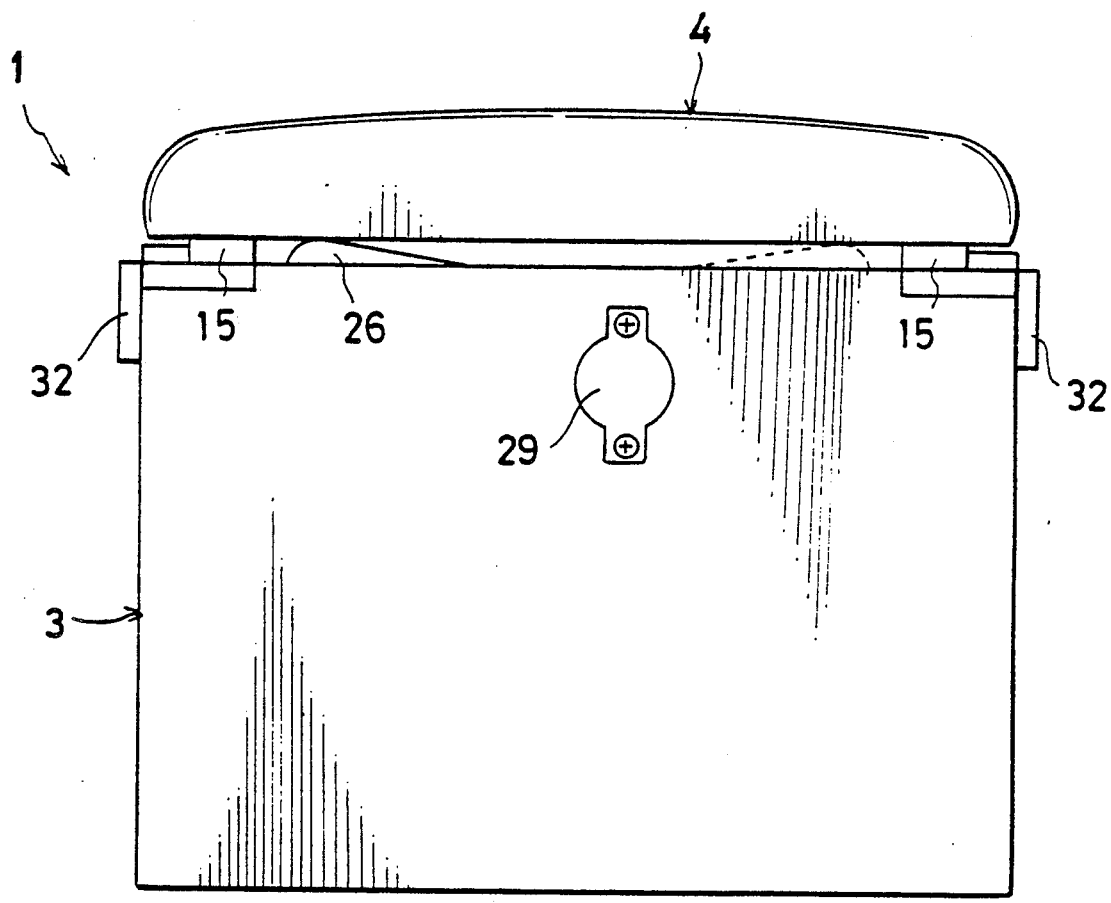
FIG. 10 is a front view showing a box to which a second embodiment of the device for opening and closing a lid according to the invention is applied.
Figure 11:
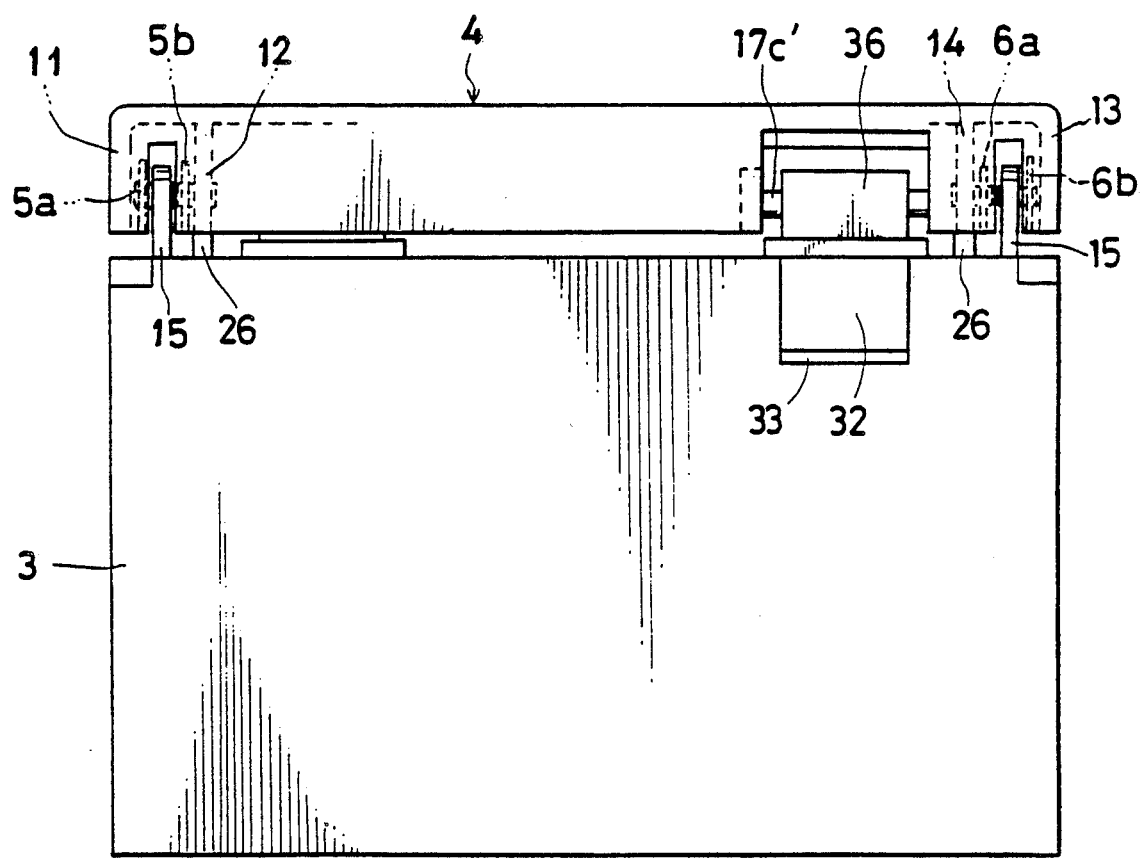
FIG. 11 is a side view showing the box of FIG. 10.

When the lid 4 is closed, the first links 5a and 6a are turned downwards in unison with the lid 4 about the pins 16a and 16c. The closed position is determined by the striking of the lower edge of the lid 4 against the upper edge of the housing 3. Where the links 5a and 6a are made of steel, they are attracted to the permanent magnets 18 (FIGS. 1, 6 and 7). Thus, the lid 4 will not be opened accidentally due to vibration produced during running of the vehicle. Also otherwise possible generation of noise due to play of each link is prevented. When the lid 4 is opened from the opposite side, i.e., the right side, as shown in FIG. 9, the second links 5b and 6b are turned upwardly in unison with the lid 4 about the pins 16b and 16d. At this time, the first links 5a and 6a remain attached to the magnets 18 and are not turned. When the lid is lowered, the second links 5b and 6b are also turned about the pins 16b and 16d downwards in unison with the lid 4, and the lid 4 is thus closed.

If the console box 1 is mounted as rotated by 90° from the orientation shown in the Figures, the lid 4 will be openable from front and rear seats of the vehicle.

FIGS. 10 to 18 show a second embodiment of the invention applied to a device for opening and closing a lid provided with means for automatically opening the lid. The opening means includes two biasing means for biasing the lid 4 in two different opening directions, two braking means for attenuating the biasing forces of the biasing means, and locking means for locking lid 4 in the closed position against the biasing force of the biasing means and permitting the opening of the lid 4 in one direction.

This embodiment of the device for opening and closing the lid has substantially the same construction as the first embodiment. Therefore, a detailed description is omitted, and parts related to the opening means only will be described.

The inner surface of the front wall 9 of the housing 3 is provided with an arm 26 having one end linked with a pin 27. As the arm 26 is turned upwardly about the pin 27, the lower edge of the front rib 12 is pushed up by the other free end of the arm. The pin 27 of the arm 26 is provided with biasing means constituted by a torsion spring 25. The torsion spring 25 has one end hooked on the arm 26 and the other end hooked on an engagement piece 28 securing it in a flexed state to the front wall 9 of the housing 3. The arm 26 is upwardly biased at all time about the pin 27 by the restoring force of the torsion spring 25.

The braking means uses a rotary damper 29 which utilizes the viscosity resistance of oil or the like as disclosed in, for instance, U.S. Pat. Nos. 4,638,528 and 4,691,589. The arm 26 is provided with an integral sector gear 30 with the pin 27 at its center. The rotary damper 29 has a gear 31 in mesh with outer teeth 30' of the sector gear 30, and it is secured to the inner surface of the front wall 9 of the housing 3.

The locking means includes a pin extension 17b' extending sidewise from the pin 17b of the second link 5b through the front rib 12 into the lid 4, a hook 32a hooked sidewise on the extension 17b', a push button 32 to be advanced and retreated through an opening 33 formed in the right side wall 20 of the housing 3, a base 34 projecting from the right side wall 20 into the housing 3, a coil spring 35 compressed between the base 34 and the push button 32 to outwardly bias the push button 32 away from the housing 3 through the opening 33 and an L-shaped opposing piece 36 opposing the hook 32a of the push button 32 and co-operating with the hook 32a to clamp the extension 17b' of the second link 5b.

The unit for opening the rear link mechanism 8 is disposed symmetrically with the unit for opening front link mechanism 7 on the opposite sides of the opening 2 of the housing 3, and the arm 26 is engaged with the lower edge of the rear rib 14 of the lid 4 such that the lid 4 can be opened by the restoring force of the torsion spring 25. The push button 32 penetrates the left side wall 19 of the housing 3 and extends to the right side, and its hook 32a locks an extension 17c' of the pin 17c of the first link 6a. Parts like those of the front link mechanism 7 are designated by like reference numerals and symbols, and their description is omitted.

Now, the operation of the console box provided with the above device with opening means will be described.

First, when opening the lid 4 from the closed state, the push button 32 on one of the side walls 19 and 20 of the housing, which depends on which side the lid is to be opened from, is pushed.

For example, when the push button 32 on the left side wall 19 of the housing 3 is pushed against the restoring force of the coil spring 35, it retreats and its hook 32a is separated from the opposing piece 36 to release the extension 17c' of the pin 17c of the first link 6a.

Figure 15:
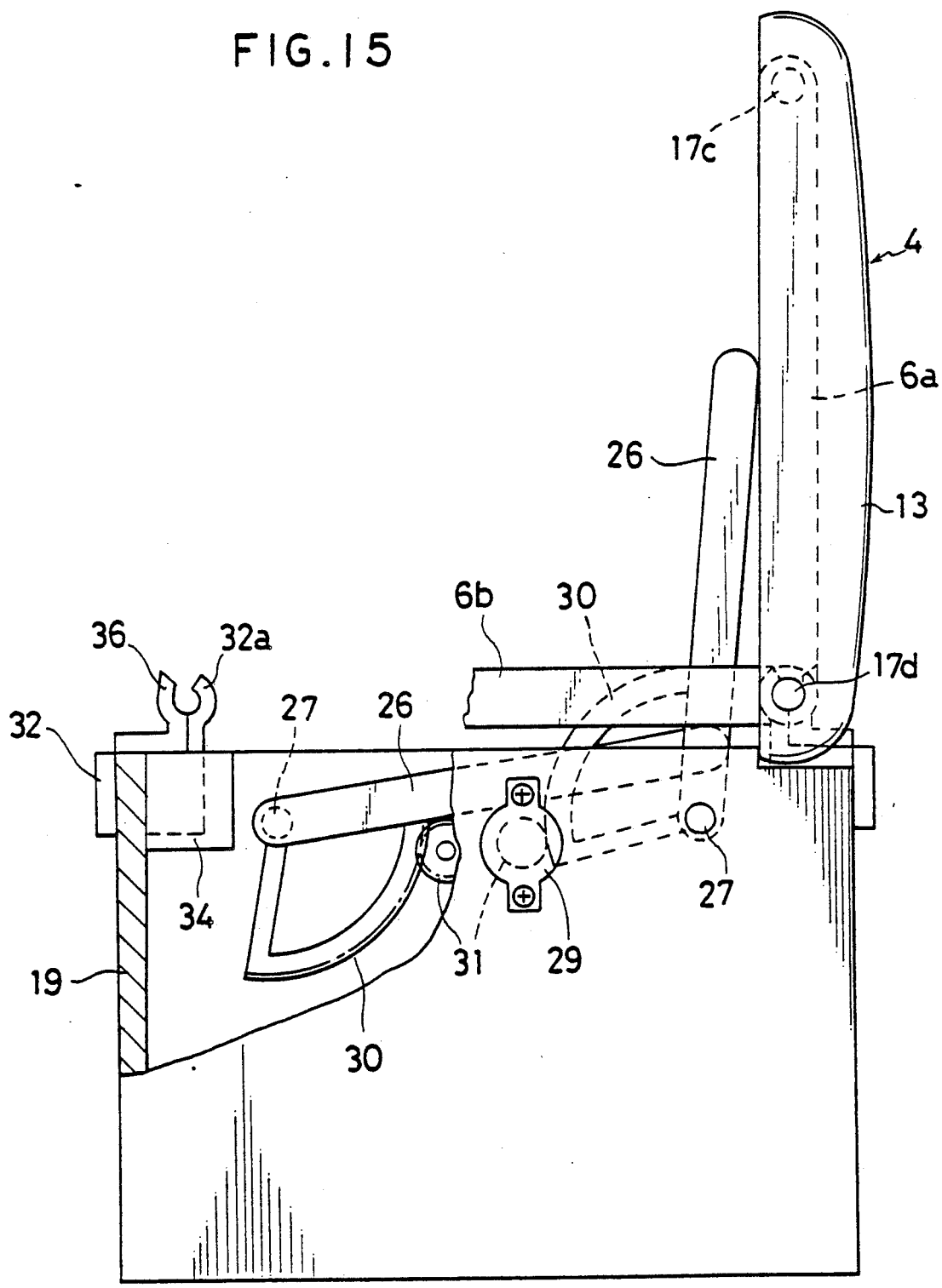
FIG. 15 is a partially sectioned front view showing the device of FIG. 12 with the lid of the box opened.
Figure 16:
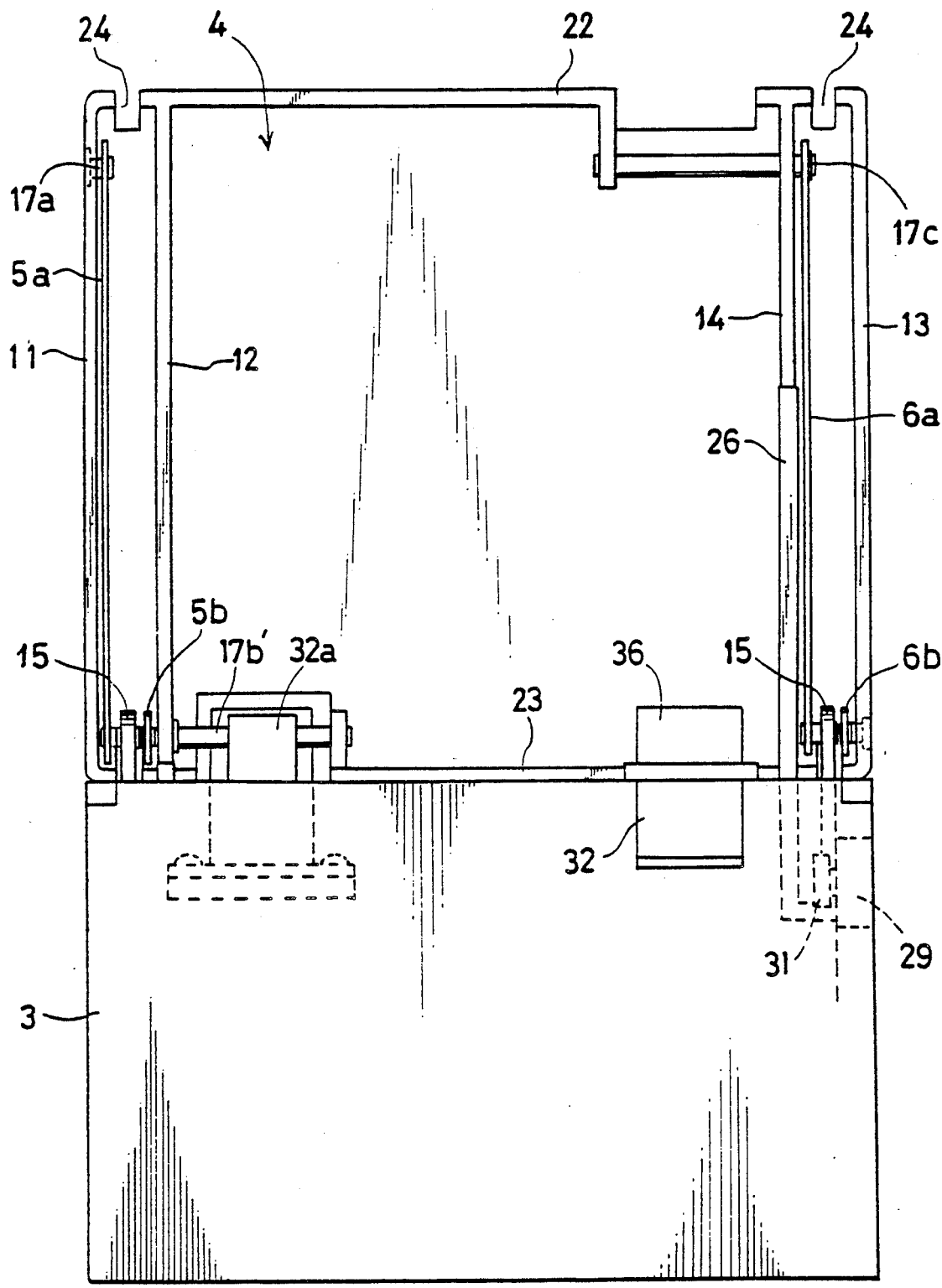
FIG. 16 is a side view showing the device of FIG. 12 with the lid opened.

For this reason, the lid 4 is pushed upwards from the free end of the arm 26, which is turned upwards by the restoring force of the torsion spring 25. The first links 5a and 6a are thus turned upwards by the pins 16a and 16c. The lid 4 thus is opened to a right upper position (FIGS. 15 to 17). At this time, the sector gear 30 of the arm 26 is displaced to cause rotation of the gear 31 of the rotary damper 29 in mesh with the sector gear 30, thus attenuating the turning force of the arm 26 by the torsion spring 25 with the viscosity resistance of oil in the damper 29.

Thus, the lid 4 opens quietly and slowly when the push button 32 is pushed.

Figure 12:
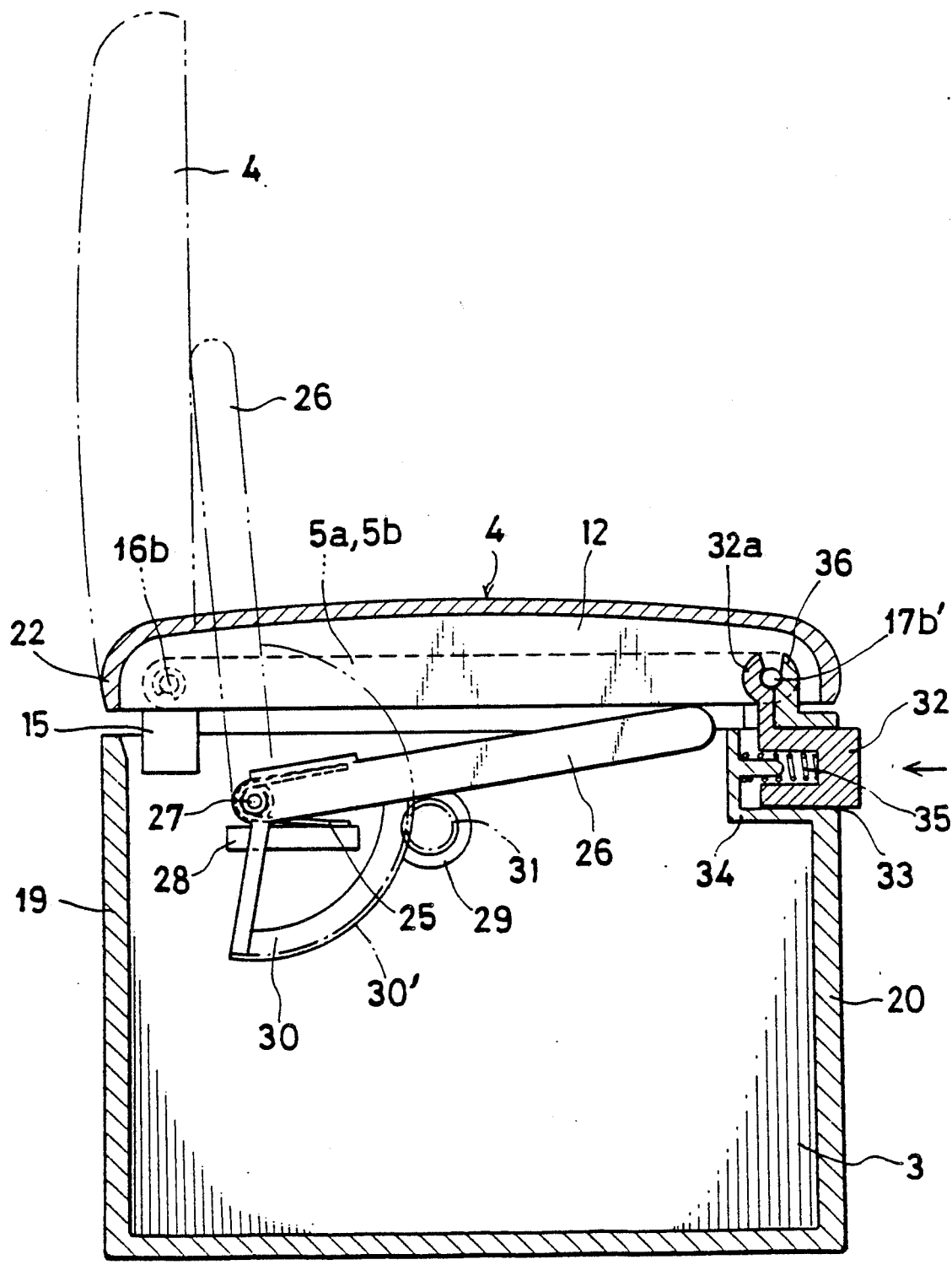
FIG. 12 is a front view showing the device of FIG. 10 with the box in section.
Figure 13:
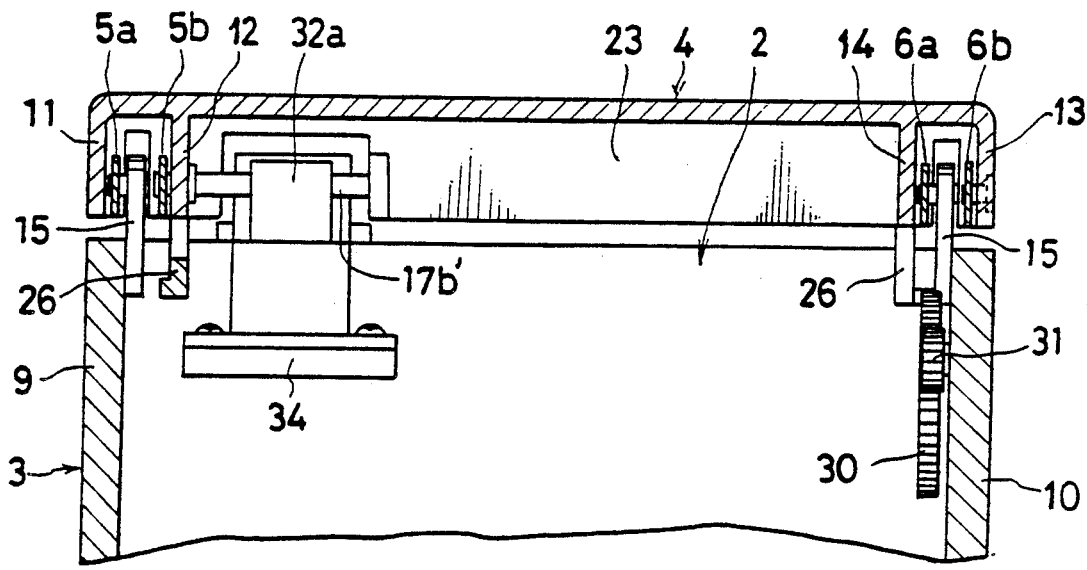
FIG. 13 is a partially cut-away side view showing the device of FIG. 12 with the box in section.
Figure 14:
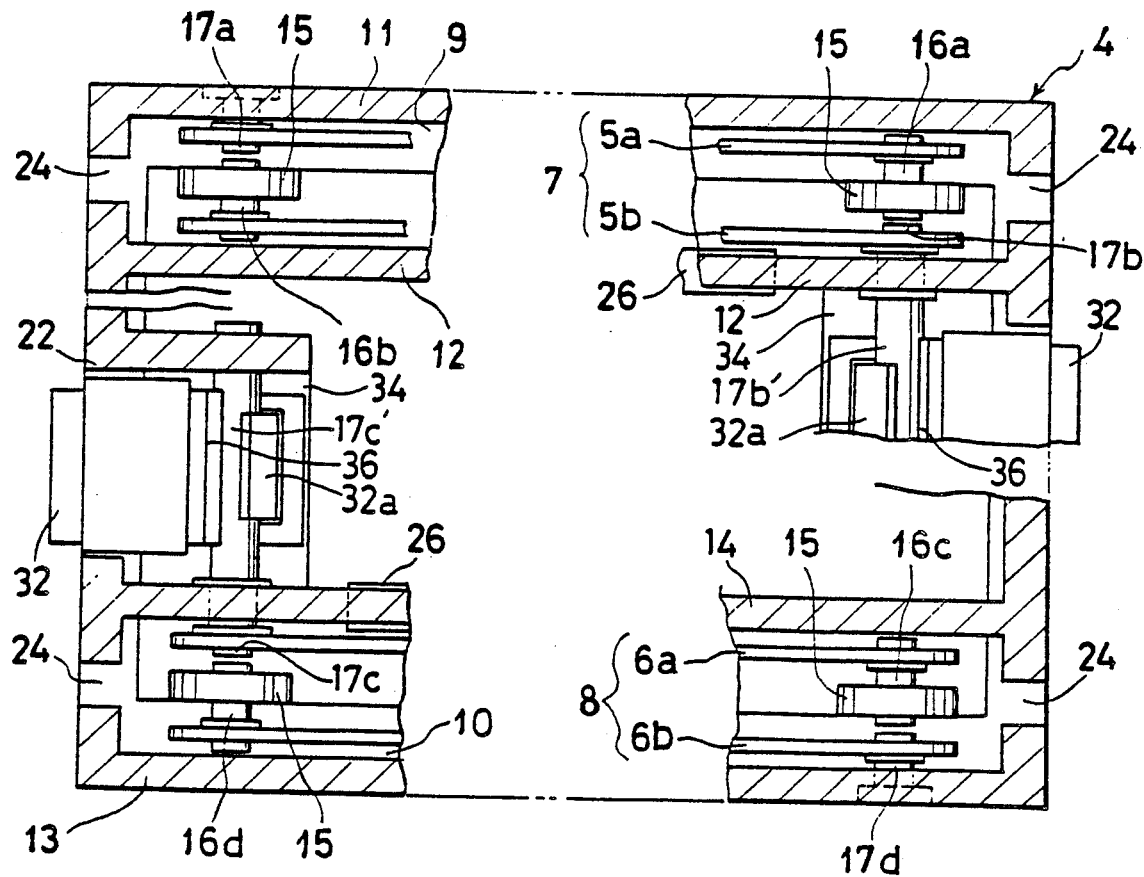
FIG. 14 is a fragmentary enlarged plan view showing the device of FIG. 12.

When closing the lid 4, the lid 4 is pushed downwards against the spring force of the torsion spring 25. When the lid 4 is downwardly pushed, the first links 5a and 6a are turned downwards about the pins 16a and 16c. Immediately before the closing, the extension 17c' of the pin 17c linking the first link 6a to the lid 4 downwardly intrudes between the opposing piece 36 of the housing and the hook 32a of the push button 32 held urged against the opposing piece 36 by the restoring force of the coil spring 35, thus causing a tentative retreat of the push button 32 against the restoring force of the coil spring 35. In this way, it intrudes into the space between the hook 32a and the opposing piece 36 (FIG. 12). Thus, the lid 4 is locked at the closed position against the restoring force stored in the torsion spring 25.

The rotary damper 29 provides braking force when closing the lid 4 as well. However, it is possible to arrange for no braking force to be provided in the direction of closing the lid 4 by providing a clutch mechanism between the rotary damper 29 and the arm 26 or using a uni-directional damper as disclosed in U.S. Pat. No. 4,697,673.

Meanwhile, when the push button 32 on the right side wall 20 of the housing 3 is pushed, the lid 4 is opened quietly and slowly to a left upper position (FIG. 18).

In the illustrated embodiment, the device according to the invention is mounted in the center console box 1 of a vehicle. However, this is by no means limitative, and it is possible to utilize the invention for the lid or door of a different box of a vehicle or for the lid or door of a piece of furniture or an electric apparatus other than those in vehicles.

Further, while the above description relates to a lid 4 which is opened upwardly, it is possible to permit the lid 4 to be opened to the left and right or upwards and downwards if the opening 2 of the housing 3 is directed sidewise.

Further, while in the above embodiments a pair of link mechanisms are provided on the opposite sides of the opening 2, it is possible to provide a link mechanism only on a single side so long as the lid can be reliably supported when opening it and also be reliably opened and closed.

Further, the locking means is not limited to those in the above embodiments. For example, it is possible to use a push type latch disclosed in U.S. Pat. No. 4,616,861, in which case the lid 4 is released from the locked state and pushed back when it is pushed. In this case, the externally operable push buttons 32 may be dispensed with.

Further, the biasing means in the second embodiment is not limited to the torsion spring 25. For example, it is possible to use a spiral spring, or a link or the lid 4 may be turned directly with biasing means. In this case, the arms 26 may be dispensed with. Further, while the arms 26 are arranged to act on the ribs 12 and 14 of the lid 4, it is possible to have the arms act on the link mechanisms 7 and 8.

Further, while the braking means uses the rotary oil damper 29, it is possible to use a governor or the like so long as it is rotary. It is further possible to use a well-known piston-cylinder type damper of air, oil or gas injection type.

As has been described in the foregoing, the device for opening and closing a lid according to the invention is realized by merely providing inversely connected paired links between a housing and a lid. Thus, it is very simple in construction and can be readily applied as a device for opening and closing a small lid. Further, by suitably incorporating locking means, biasing means and braking means, it is possible to prevent accidental opening of the lid and permit the lid to be opened quietly and slowly in a desired direction by a one-push operation, thus providing a high class operation.

What is claimed is:

1. A device for opening and closing a lid for opening and closing an opening of a housing, comprising:
   first link means having one end linked to a first end of one side edge of said housing and the other end linked to a second end of one side edge of said lid, said one side edge of said housing and said one side edge of said lid facing each other; and
   second link means extending parallel to said first link means and having one end like said one end of said first link means linked to a first end of said one side edge of said lid and the other end like said other end of said first link means linked to a second end of said one side edge of said housing, said first end of said housing and said first end of said lid facing each other, said second end of said housing and said second end of said lid facing each other;
   first locking means provided on said one side edge of said housing for locking said first ink means; and
   second locking means provided on said one side edge of said housing for locking said second link means.

2. The device according to claim 1, wherein said first and second locking means are permanent magnets.

3. The device according to claim 1, further comprising biasing means provided on said housing for biasing said lid in a direction of opening said lid.

4. The device according to claim 3, further comprising braking means provided on said housing for attenuating the biasing force of said biasing means.

5. A device for opening and closing a lid on a housing, said device comprising:
   a first link having a first end rotatably fixed to said housing and a second end rotatably fixed to said lid; and
   a second link having a first end rotatably fixed to said lid and a second end rotatably fixed to said housing;

said first link being pivotable about said first end of said first link while said second link is held stationary with respect to said housing, thereby allowing said lid to be opened to a first open position, and said second link being pivotable about said second end of said second link while said first link is held stationary with respect to said housing, thereby allowing said lid to be opened to a second open position.

6. The device according to claim 5, further comprising:

a third link having a first end rotatable fixed to said housing and a second end rotatable fixed to said lid; and a fourth link having a first end rotatably fixed to said lid and a second end rotatable fixed to said housing;

said third link being pivoted about said first end of said third link when said lid is opened to said first open position, and said fourth link being pivoted about said second end of said fourth link when said lid is opened to said second open position.

7. The device according to claim 5, further comprising locking means provided on said housing for independently locking said first and second link means.

8. The device according to claim 7, wherein said locking means is a permanent magnet.

9. The device according to claim 5, further comprising a first biasing means provided on said housing for biasing said lid in a direction of opening said lid to said first open position.

10. The device according to claim 9, further comprising a second biasing means provided on said housing for biasing said lid in a direction of opening said lid to said second open position.

11. The device according to claim 9, further comprising a first braking means provided on said housing for attenuating the biasing force of said first biasing means.

12. The device according to claim 10, further comprising a first braking means provided on said housing for attenuating the biasing force of said first biasing means and a second braking means provided on said housing for attenuating the biasing force of said second biasing means.

13. A device according to claim 5, wherein said lid has a closed position in which said first and second links are arranged parallel to one another.

14. A device according to claim 6, wherein said lid has a closed position in which said first, second, third, and fourth links are arranged parallel to one another.

15. A housing having a lid alternatively pivotable about first and second pivot axes, comprising:

a first link having a first end rotatably fixed to said housing allowing said first link to be pivoted about said first pivot axis, said first link also having a second end rotatably fixed to said lid allowing said lid to be pivoted relative to said first link about said second pivot axis;

a second link having a first end rotatably fixed to said lid allowing said lid to be pivoted relative to said second link about said first pivot axis, said second link also having a second end rotatably fixed to said housing so as to allow said second link to be pivoted about said second pivot axis;

wherein said second link is maintained in a fixed relationship with respect to said housing and said first link is pivoted about said first pivot axis to open said lid to a first open position, and wherein said first link is maintained in a fixed relationship with respect to said housing and said second link is pivoted about said second pivot axis to open said lid to a second open position.

16. The housing as claimed in claim 15, wherein said lid is pivoted in a first direction about said first pivot axis to be opened to said first open position, and wherein said lid is pivoted in a second direction about said second pivot axis to be opened to said second open position.

17. The device as claimed in claim 15, wherein said housing is located in a motor vehicle between two passenger seats and wherein said first and second pivot axes are parallel to one another and to a direction of travel of the vehicle.

* * * * *